United States Patent
Tan (10) Patent No.: US 10,173,748 B1
(45) Date of Patent: Jan. 8, 2019

(54) BICYCLE PEDAL

(71) Applicant: SHIMANO (SINGAPORE) PTE. LTD., Singapore (SG)

(72) Inventor: Chun Sing Tan, Singapore (SG)

(73) Assignee: SHIMANO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/825,655

(22) Filed: Nov. 29, 2017

(51) Int. Cl.
*B62M 3/00* (2006.01)
*B62M 3/08* (2006.01)

(52) U.S. Cl.
CPC .............. *B62M 3/086* (2013.01); *B62M 3/08* (2013.01)

(58) Field of Classification Search
CPC .......... B62M 3/08; B62M 3/086; B62M 3/10; B62M 3/16; G05G 1/30; B62K 3/00
See application file for complete search history.

(56) References Cited

U.S. PATENT DOCUMENTS

| | | | | |
|---|---|---|---|---|
| 4,932,287 A | * | 6/1990 | Ramos | ................... B62M 3/086 36/131 |
| 5,704,256 A | * | 1/1998 | De Lattre | ............ A43B 1/0054 36/131 |
| 6,324,941 B1 | | 12/2001 | Ho | |
| 9,527,549 B2 | * | 12/2016 | Pepito | .................... B62M 3/086 |
| 2008/0229875 A1 | * | 9/2008 | Ray | ........................ B62M 3/086 74/594.6 |

FOREIGN PATENT DOCUMENTS

| | | | | |
|---|---|---|---|---|
| DE | 10207047 A1 | * | 8/2003 | .............. B60T 7/042 |
| JP | 03243488 A | * | 10/1991 | ........... A43B 1/0054 |

* cited by examiner

*Primary Examiner* — Adam D Rogers
(74) *Attorney, Agent, or Firm* — Oliff PLC (57) ABSTRACT

A bicycle pedal is provided that includes a pedal axle, a pedal body, a first clamping member, a second clamping member, and a biasing structure. The pedal axle defines a rotational axis. The pedal body is rotatably supported on the pedal axle. The first clamping member is movably coupled to the pedal body between a first clamping position and a first open position. The second clamping member provided is on the pedal body. The second clamping member is configured to clamp a cleat between the first clamping member and the second clamping member in a clamping state where the first clamping member is in the first clamping position. The biasing structure includes at least one magnet to bias the first clamping member toward the first clamping position.

20 Claims, 9 Drawing Sheets

BICYCLE PEDAL

BACKGROUND

Bicycle pedals have been provided that clamp or bind a bicycle rider's shoe to the pedal to increase pedaling efficiency by accurately locating the shoe on the pedal and allowing a rider to pull up on the pedal as well as push down.

SUMMARY

For such pedals to be effective, a rider must be able to easily apply a force to engage or disengage a cleat on the rider's shoe from the pedal. Further, a clamping or binding structure on the pedal must strongly bind the cleat to the pedal so that the cleat does become inadvertently disengaged. Exemplary embodiments of the inventive bicycle pedal described herein address one or more of these needs. For example, exemplary embodiments reduce a force required to engage a cleat with a bicycle pedal and a force to disengage the cleat from the bicycle pedal, while still firmly holding the cleat in place while it is engaged with the bicycle pedal.

According to a first aspect of one or more exemplary embodiments, a bicycle pedal is provided that includes a pedal axle, a pedal body, a first clamping member, a second clamping member, and a biasing structure. The pedal axle defines a rotational axis. The pedal body is rotatably supported on the pedal axle. The first clamping member is movably coupled to the pedal body between a first clamping position and a first open position. The second clamping member provided is on the pedal body. The second clamping member is configured to clamp a cleat between the first clamping member and the second clamping member in a clamping state where the first clamping member is in the first clamping position. The biasing structure includes at least one magnet to bias the first clamping member toward the first clamping position.

According to this configuration, it is possible to reduce a force to engage the cleat with the bicycle pedal and a force to disengage the cleat from the bicycle pedal, while still firmly holding the cleat in place while it is engaged with the bicycle pedal.

According to a second aspect of one or more exemplary embodiments, the bicycle pedal according to the first aspect is configured so that the at least one magnet includes a first magnet to bias the first clamping member toward the first clamping position. The biasing structure further includes a first biasing element made of a magnetic material that biases the first magnet toward the first biasing element. The first magnet is disposed on one of the first clamping member and the pedal body. The first biasing element is disposed on the other of the first clamping member and the pedal body.

According to this configuration, it is possible to reduce a force to engage the cleat with the bicycle pedal and a force to disengage the cleat from the bicycle pedal, while still firmly holding the cleat in place while it is engaged with the bicycle pedal.

According to a third aspect of one or more exemplary embodiments, the bicycle pedal according to the second aspect is configured so that the first biasing element includes a first additional magnet. Because of the additional magnet, it is possible to reduce a force to engage the cleat with the bicycle pedal and a force to disengage the cleat from the bicycle pedal, while even more firmly holding the cleat in place while it is engaged with the bicycle pedal.

According to a fourth aspect of one or more exemplary embodiments, the bicycle pedal according to either of the second or third aspects is configured so that the first magnet faces the first biasing element such that a gap is formed between the first magnet and the first biasing element in the first clamping position. According to this configuration, it is possible to ensure reliable contact between the first clamping member and the pedal body in the first clamping position.

According to a fifth aspect of one or more exemplary embodiments, the bicycle pedal according to the fourth aspect is configured so that the gap is larger than 0 mm and less than or equal to 5 mm. Keeping the gap within this range optimizes the biasing force of the biasing structure.

According to a sixth aspect of one or more exemplary embodiments, the bicycle pedal according to any of the second through fifth aspects is configured so that the first clamping member is slidably coupled to the pedal body. According to this configuration, the elements of the biasing structure are linearly displaced, which allows the first clamping member to linearly clamp the cleat and optimizes the biasing force created by the magnetic field of the first magnet by keeping a pole of the first magnet oriented towards the first biasing element.

According to a seventh aspect of one or more exemplary embodiments, the bicycle pedal according to the sixth aspect is configured so that one of the pedal body and the first clamping member includes a first receiving space. The other of the pedal body and the first clamping member includes a first projection slidably disposed in the receiving space. According to this configuration, the linear displacement of the first clamping member can be achieved with a simple structure.

According to an eighth aspect of one or more exemplary embodiments, the bicycle pedal according to the seventh aspect further includes a sliding bush disposed in the first receiving space to slidably support the first projection in the first receiving space. By using the sliding bush, smooth linear displacement of the first clamping member can be achieved.

According to a ninth aspect of one or more exemplary embodiments, the bicycle pedal according to the eighth aspect is configured so that the sliding bush is at least partly disposed between an outer peripheral surface of the first projection and an inner peripheral surface of the first receiving space. According to this configuration, smooth linear displacement of the first clamping member can be achieved.

According to a tenth aspect of one or more exemplary embodiments, the bicycle pedal according to any of the seventh through ninth aspects is configured so that the first magnet is coupled to an end of one of the first projection and the first receiving space. The first biasing element is coupled to an end of the other of the first projection and the first receiving space. According to this structure, it is possible to dispose the biasing structure within the path of the sliding movement of the first projection. This optimizes the biasing force created by the magnetic field of the first magnet by keeping a pole of the first magnet oriented towards the first biasing element during the sliding movement of the first projection.

According to an eleventh aspect of one or more exemplary embodiments, the bicycle pedal according to any of the seventh through tenth aspects is configured so that the first receiving space has an external opening disposed on an outer surface of the pedal body. The first clamping member includes the first projection inserted into the external opening. According to this configuration, smooth linear displacement of the first clamping member can be achieved.

According to a twelfth aspect of one or more exemplary embodiments, the bicycle pedal according to the eleventh aspect is configured so that the pedal body includes a second receiving space spaced apart from the first receiving space. The first clamping member includes a second projection slidably disposed in the second receiving space. By using the second receiving space and the second projection, it is possible to more stably slidably support the first clamping member on the pedal body.

According to a thirteenth aspect of one or more exemplary embodiments, the bicycle pedal according to the twelfth aspect is configured so that the external opening has a central axis. The first clamping member includes a first clamping portion disposed between the first projection and the second projection as viewed from a direction parallel to the central axis. According to this configuration, it is possible to more evenly apply the biasing force to the first clamping portion.

According to a fourteenth aspect of one or more exemplary embodiments, the bicycle pedal according to any of the sixth through thirteenth aspects is configured so that the first clamping member is movable in a sliding direction perpendicular to the rotational axis. According to this configuration, it is possible to bias the first clamping member in a direction toward the pedal axle.

According to a fifteenth aspect of one or more exemplary embodiments, the bicycle pedal according to any of the first through fourteenth aspects is configured so that the first clamping member includes a first clamping portion extending toward the pedal axle. The pedal body includes a pair of guiding walls between which the first clamping portion is disposed. According to this configuration, it is possible to reliably guide the cleat during clamping and disengaging by maintaining the cleat between the pair of guiding walls and then reliably holding the cleat in place between the clamping walls when clamped.

According to a sixteenth aspect of one or more exemplary embodiments, the bicycle pedal according to the fifteenth aspect is configured so that the pair of guiding walls each have a guiding surface to guide the cleat between the pair of guiding walls. According to this configuration, it is possible to smoothly guide the cleat during clamping and disengaging.

According to a seventeenth aspect of one or more exemplary embodiments, the bicycle pedal according to any of the first through sixteenth aspects further includes a cage at least partially surrounding the pedal body. The cage is heavier on a side of the pedal axle having the first clamping member than on a side of the pedal axle having the second clamping member so that the first clamping member rests lower than the second clamping member relative to a ground plane in a state in which the pedal axle is mounted on a bicycle that is positioned upright on the ground plane.

According to this configuration, it is possible to for the first clamping member to tilt towards the cleat in a resting state of the pedal so that the clamping member is in an orientation to accept the cleat without a rider having to first manually orient the pedal.

According to a eighteenth aspect of one or more exemplary embodiments, the bicycle pedal according to any of the second through seventeenth aspects is configured so that the second clamping member is movably coupled to the pedal body between a second clamping position and a second open position. The at least one magnet includes a second magnet disposed on one of the second clamping member and the pedal body to bias the second clamping member toward the second clamping position. The biasing structure further includes a second biasing element that is disposed on the other of the second clamping member and the pedal body, is made of a magnetic material, and biases the second magnet toward the second biasing element.

According to this configuration, it is possible for a rider to select an engagement direction by inserting the cleat from a direction that causes the first clamping member to move, a direction that causes the second clamping member to move, or a direction that causes both the first and second clamping members to move.

According to a nineteenth aspect of one or more exemplary embodiments, the bicycle pedal according to the eighteenth aspect is configured so that the first clamping member and the second clamping member are symmetrically disposed with respect to the pedal axle. According to this configuration, it is possible to simplify the structures of first and second clamping member so that common parts can be used for the first and second clamping members.

According to a twentieth aspect of one or more exemplary embodiments, the bicycle pedal according to either of the eighteenth or nineteenth aspects is configured so that the first clamping member and the second clamping member are configured to permit entry and release of the cleat in a state in which at least one of: (i) the first clamping member is in the first open position, and (ii) the second clamping member is in the second open position. According to this configuration, it is possible for a rider to select an engagement direction by inserting the cleat from a direction that causes the first clamping member to move, a direction that causes the second clamping member to move, or a direction that causes both the first and second clamping members to move.

These and other objects, features, aspects and advantages will become apparent to the skilled artisan from the following detailed description, which taken in conjunction with the annexed drawings, discloses details of certain exemplary embodiments.

BRIEF DESCRIPTION OF THE DRAWINGS

Exemplary embodiments are described below with reference to the following drawings:

FIGS. 3A-4D depict a process of clamping a cleat into the first exemplary embodiment of the bicycle pedal;

FIGS. 9A-10C depict a process of clamping the cleat into a second exemplary embodiment of the bicycle pedal;

DETAILED DESCRIPTION OF EMBODIMENTS

It will be apparent to the skilled artisan in the bicycle field from this disclosure that the following descriptions of exemplary embodiments are provided as examples only and need not limit the broad inventive principles described herein or included in the appended claims.

FIGS. 1-7B depict a first exemplary embodiment of a bicycle pedal 1. In use, the bicycle pedal 1 is typically attached to the crank arm (not shown) of the bicycle (not shown). As shown in FIGS. 1A and 1B, the bicycle pedal 1 includes a pedal axle 5, a pedal body 10, a first clamping member 20, and second clamping member 30. The pedal axle 5 rotatably supports the pedal body 10. As such, the pedal axle 5 defines a rotational axis A about which the pedal 1 rotates in use. As shown in FIG. 1B, the first clamping member 20 and the second clamping member 30 cooperate to clamp a cleat 100 onto the pedal body 10. The cleat 100 is configured to be attached to a sole of a rider's shoe (not shown). This way the rider's shoe can be clamped onto the pedal 1 for efficient pedaling.

Figure 1A:
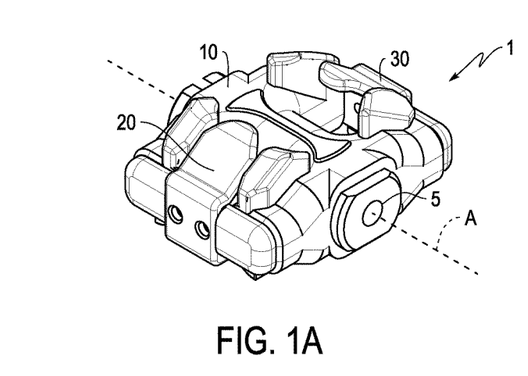
FIG. 1A depicts a first exemplary embodiment of the bicycle pedal.
Figure 1B:
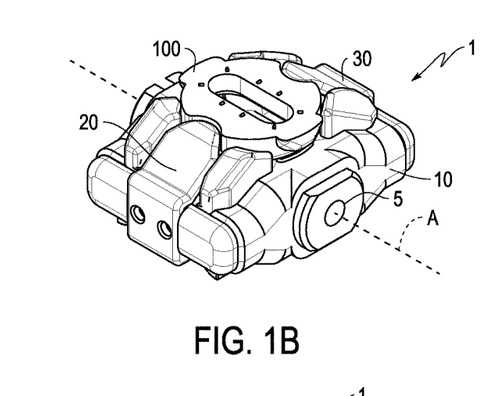
FIG. 1B depicts the first exemplary embodiment of the bicycle pedal with a cleat clamped therein.
Figure 2A:
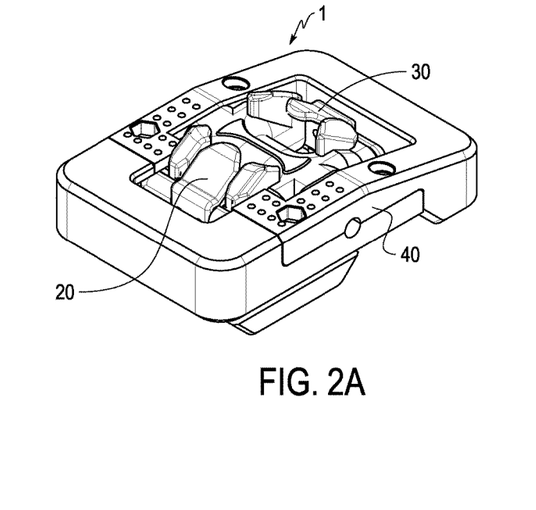
FIG. 2A depicts the first exemplary embodiment of the bicycle pedal with an optional cage.
Figure 2B:
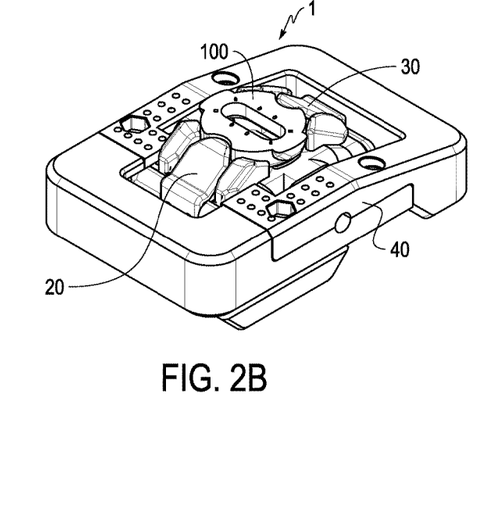
FIG. 2B depicts the first exemplary embodiment of the bicycle pedal with the optional cage with a cleat clamped therein.
Figure 3A:
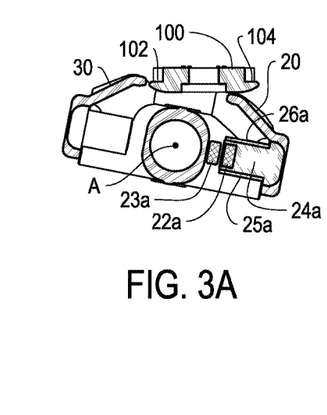
Figure 3B:
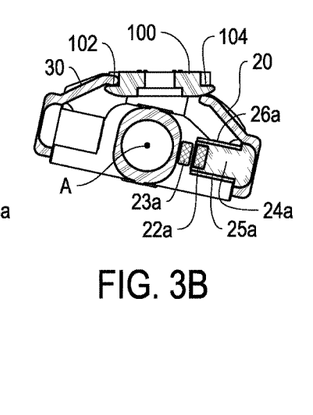
Figure 3C:
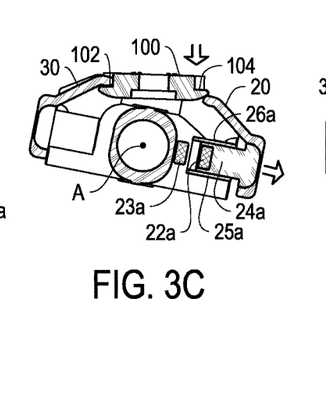
Figure 3D:
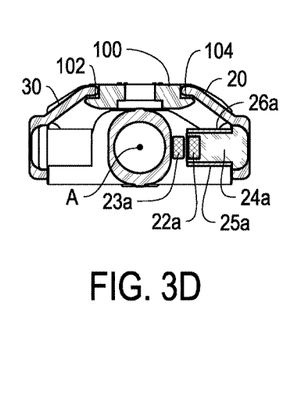
Figure 4A:
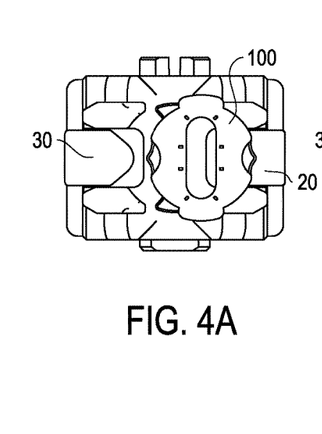
Figure 4B:
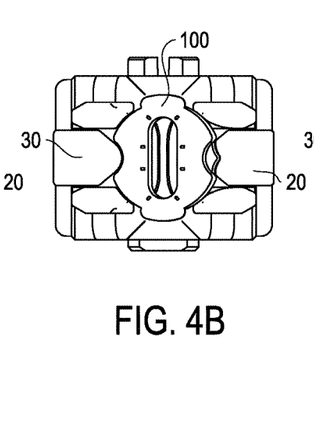
Figures 4C, 4D:
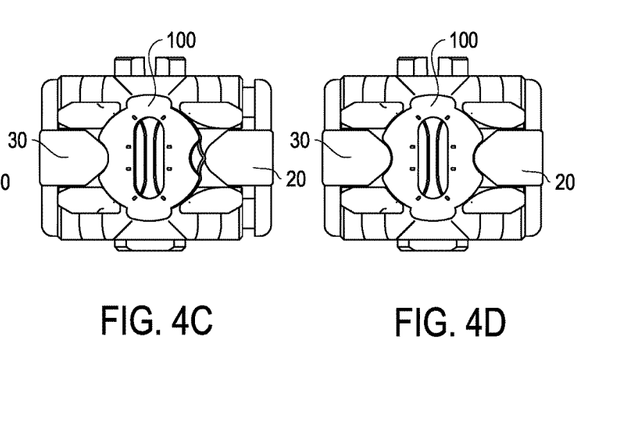

FIGS. 3A-4D show a process of clamping the cleat 100 onto the pedal body 10. FIGS. 3A and 4A show a closed position of the bicycle pedal 1 before the cleat 100 begins entry. FIGS. 3B and 4B show a state in which a front lip 102 of the cleat 100 slides under the second clamping member 30. FIGS. 3C and 4C show a state in which a downward force is applied from the cleat 100 so that a rear lip 104 of the cleat 100 forces the first clamping member 20 in a direction away from the rotational axis A into a first open position. FIGS. 3D and 4D show a state in which the cleat 100 has passed below the first clamping member 20 when it was in the first open position, and the first clamping member 20 has returned to its original state, thereby clamping the cleat 100 onto the body 10 of the pedal 1 between the first clamping member 20 and the second clamping member 30. In FIGS. 3D and 4D, the first clamping member 20 is in a first clamping position.

As shown in FIGS. 3A-4D, for the first clamping member 20 to clamp the cleat 100, the first clamping member 20 is movably coupled to the pedal body 10 between the first clamping position (FIGS. 3D and 4D) and the first open position (FIGS. 3C and 4C). According to this embodiment, the second clamping member 30 is configured to clamp the cleat 100 between the first clamping member 20 and the second clamping member 30 when the first clamping member 20 is in the first clamping position. Also, as shown in FIGS. 3A-3D, the bicycle pedal 1 includes a biasing structure that includes a first magnet 22a that biases the first clamping member 20 toward the first clamping position. One way the magnet 22a can achieve this is by attracting a first biasing element 23a made of a magnetic material so that the magnet 22a is biased (i.e., attracted by a magnetic force) toward the first biasing element 23a. The first magnet 22a can be disposed on the first clamping member 20 and the first biasing element 23a can be disposed on the pedal body 10. Alternatively, the first biasing element 23a can be disposed on the first clamping member 20 and the first magnet 22a can be disposed on the pedal body 10.

The biasing element 23a may be made of a magnetic material such as, for example, iron, nickel, cobalt, gadolinium, or dysprosium, or an alloy containing one or more of these materials. Alternatively, the first biasing element 23a can itself be a magnet. In other words, the first biasing element 23a includes a first additional magnet. Unlike a spring, which applies a generally constant or increasing force when it is compressed or twisted, the attraction force of a magnet (such as first magnet 22a) substantially decreases as it moves away from another magnetic body (such as biasing element 23a) even if the movement is over a very short distance. This way, magnet 22a and biasing element 23a can both reduce a force necessary for a rider to engage cleat 100 with the bicycle pedal 1 and reduce a force necessary for a rider to disengage the cleat 100 from the bicycle pedal 1 compared to the forces necessary to compress or twist a spring to engage a cleat with a pedal using a spring to bias a clamping member or compress a spring to disengage a cleat from a pedal using a spring to bias a clamping member. At the same time, first magnet 22a and first biasing element 23a can firmly holding the cleat 100 in place while it is clamped onto the bicycle pedal 1 with a force equal to or greater than the force of a pedal using a spring to bias the clamping member.

As shown in FIGS. 3A-3D, the first clamping member 20 is slidably coupled to the pedal body 10. On the other hand, in the illustrated embodiment, the second clamping member 30 is stationary with respect to the pedal body 10. It is possible to form the second clamping member as an integrated part of the pedal body 10. For example, according to this embodiment, the pedal body 10 includes a first receiving space 25a with an opening 27a (see FIG. 13) and the first clamping member 20 includes a first projection 24a slidably disposed in the receiving space 25a through the opening 27a. The sliding direction can be, for example, perpendicular to the rotational axis A. Alternatively, the pedal body 10 can include the first projection 24a and the first clamping member 20 can include the first receiving space 25a.

In order to prevent the first clamping member 20 from coming off of the pedal body 10, a sliding range of the first projection 24a within the receiving space 25a is limited to be less than a longitudinal length of the first projection 24a. Further, when the optional cage 40 is used, the first clamping member 20 can be configured to abut against the cage 40 in axially outer direction to limit the movable range of the first clamping member 20. Even if the cage 40 is not used, the pedal body 10 can be configured so that the first clamping member 20 abuts the pedal body 10 in an axially outward direction to restrict the movable range of the first clamping member 20.

According to this embodiment, the first magnet 22a is coupled to an end of the first projection 24a and the first biasing element 23a is coupled to an end of the first receiving space 25a. Alternatively, the first magnet 22a can be coupled to the end of the first receiving space 25a and the first biasing element 23a can be coupled to the end of the first receiving space 24a. As an alternative to the sliding engagement of the first clamping member 20 to the pedal body 10, the first clamping member 20 can be pivotally coupled to the pedal body 10 via a pivot pin.

As a result of the above structure, the first projection 24a and the first receiving space 25a allow for linear sliding of the first magnet 22a relative to the first biasing element 23a. Due to the linear sliding, a magnetic pole of the first magnet 22a is always facing the first biasing element 23a, thereby keeping a magnetic field of the first magnet 22a oriented in way that ensures reliable magnetic attraction between the first magnet 22a and the first biasing element 23a in both the first clamping position and the first open position.

To allow for smooth sliding of the first projection 24a within the receiving space 25a, as shown in FIGS. 3A-3D, a sliding bush 26a can be disposed in the first receiving space 25a to slidably support the first projection 24a in the first receiving space 25a. In particular, the sliding bush 26a can be disposed between an outer peripheral surface of the first projection 24a and an inner peripheral surface of the first receiving space 25a.

Figure 5A:
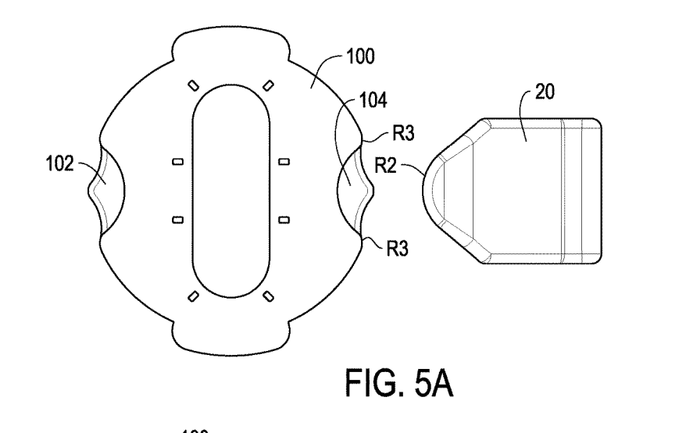
FIGS. 5A-5B depict radii of curvature of surfaces on the first clamping member and cleat of the first exemplary embodiment of the bicycle pedal.
Figure 5B:
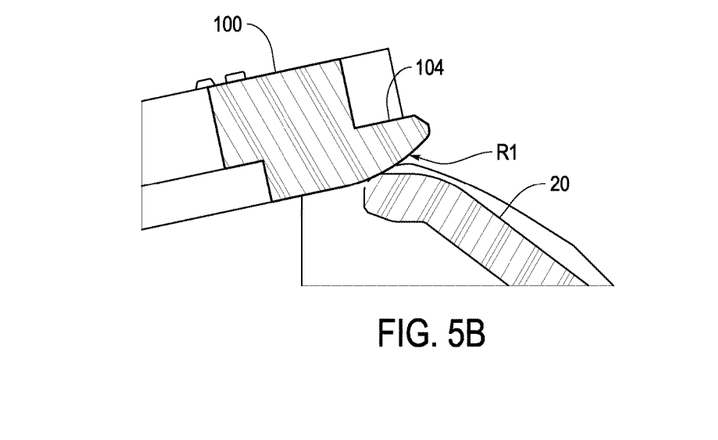

As shown in FIGS. 5A and 5B, the cleat 100 and the first clamping member 20 can include specific radii of curvature to allow for smooth entry and exit of the cleat 100. In particular, for example, as shown in FIG. 5A, the bottom side of rear lip 104 of the cleat 100 can include a radius of curvature R1. The top side of the first clamping member 20 facing the bottom side of rear lip 104 can be either flat or curved as long as it can effectively apply a horizontal force on the first clamping member 20. These surfaces allow for the downward force of the cleat 100 to smoothly force the first clamping member 20 away from the rotational axis A and into the first open position during entry of the cleat 100 into the bicycle pedal 1. According to this embodiment, the radius of curvature R1 is in a range of 7 mm-9 mm.

Figure 10A:
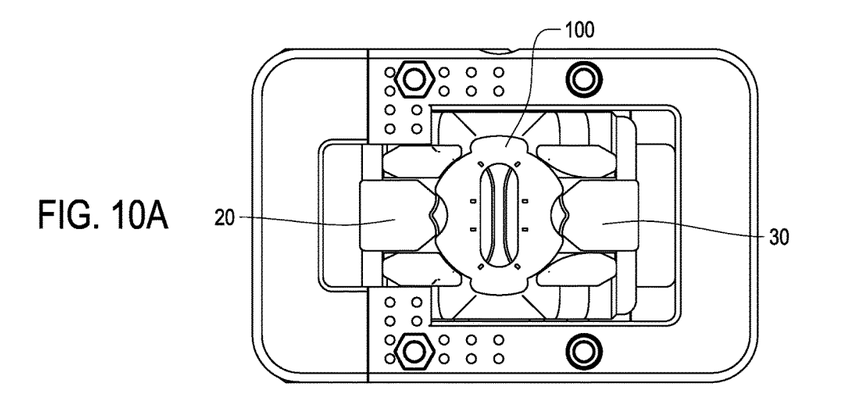
Figure 10B:
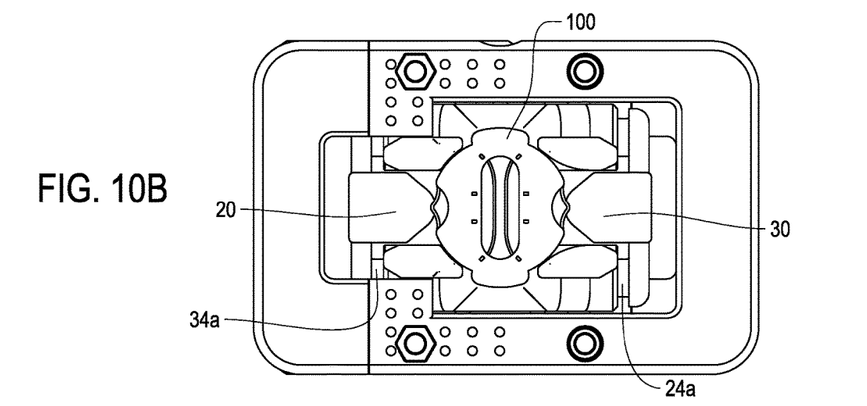

Further, for example, as shown in FIG. 5B, the front-facing side of the first clamping member 20 can include a radius of curvature R2 and the rear lip 104 of the cleat 100 can include radii of curvature R3. These radii of curvature R2, R3 allow for rotational movement of the cleat 100 to smoothly force the first clamping member 20 away from the rotational axis A and into the first open position during exit of the cleat 100 from the bicycle pedal 1 (explained in further detail below with respect to FIGS. 10A-10C). According to this embodiment, the radius of curvature R2 is in a range of 4 mm-6 mm and the radii of curvature R3 are in a range of 1 mm-2 mm. The radii of curvature R1, R2, and/or R3 can be provided for the first clamping member 20 and the corresponding rear lip 104 and/or the second clamping member 30 and the corresponding front lip 102.

Figure 6:
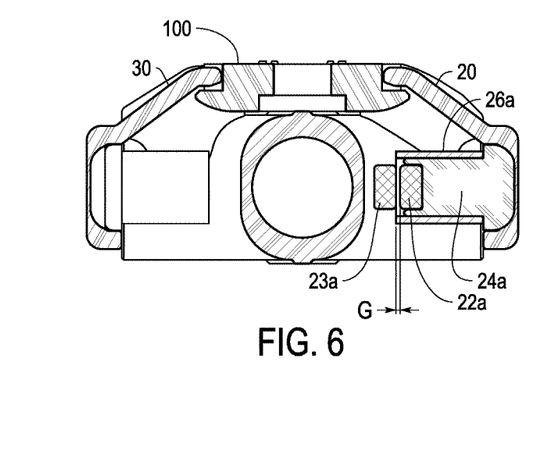
FIG. 6 is a cross-sectional view of the first exemplary embodiment of the bicycle pedal viewed along the rotational axis.

FIG. 6 depicts a cross-sectional view of the first exemplary embodiment of the bicycle pedal 1 viewed along the rotational axis A with the first clamping member 20 in the first clamping position. As shown in FIG. 6, when the first clamping member 20 is in the first clamping position, there is a gap having a width G between the first magnet 22a and the first biasing element 23a. Because of this gap, a rearward-facing surface 10a of the pedal body 10 can reliably contact a frontward-facing surface 20a of the first clamping member 20. The width G of the gap is preferably greater than 0 mm and less than or equal to 5 mm.

Figure 7A:
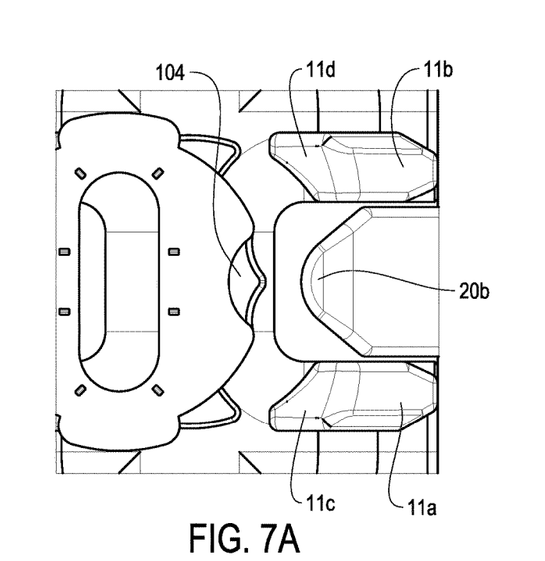
FIGS. 7A-7B depict enlarged partial views of the first exemplary embodiment of the bicycle pedal showing the guiding walls.
Figure 7B:
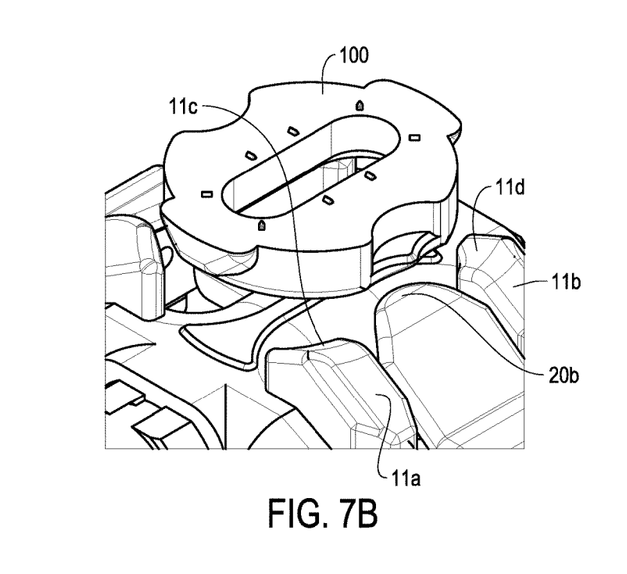

As shown in FIGS. 7A and 7B, the first clamping member 20 includes a first clamping portion 20b extending toward the pedal axle 5. The pedal body 10 includes a pair of guiding walls 11a, 11b between which the first clamping portion 20b is disposed. The guiding walls 11a, 11b each have upward-facing guiding surfaces 11c, 11d that slope down toward the first clamping portion 20b and down toward the pedal axle 5. These guiding surfaces contact the downward-facing surface of the cleat 100 to guide the cleat 100 between the guiding walls 11a, 11b when the cleat 100 is moving downwards towards the pedal body 10 so that the rear lip 104 is oriented to be facing the first clamping portion 20b and the bottom side of rear lip 104 having the radius of curvature R1 can reliably contact the upper surface of the first clamping member 20.

Figure 8:
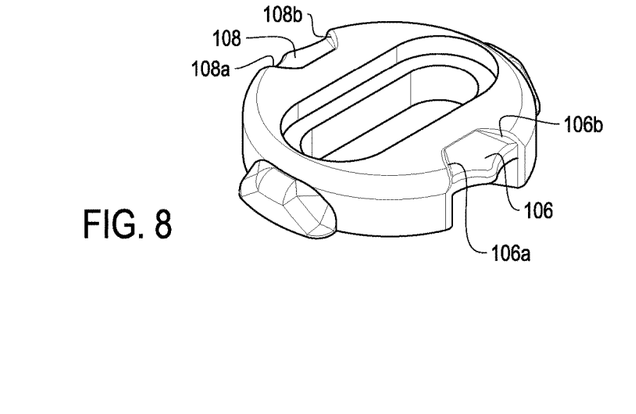
FIG. 8 depicts an underside surface of a cleat usable with the first exemplary embodiment of the bicycle pedal.

FIG. 8 shows the downward-facing surface of cleat 100. As shown in FIG. 8, the downward-facing surface can have indentation 106 including sloping sides 106a, 106b. When the cleat 100 is oriented by the guiding walls 11a, 11b, indentation 106 is aligned with and contacts the first clamping portion 20b to further ensure that the rear lip 104 engages with the first clamping portion 20b. As shown in FIG. 8, the downward-facing surface of cleat 100 can also have indentation 108 including sloping sides 108a, 108b to contact the second clamping member 30 and aid in alignment of the cleat 100 relative to the pedal body 10.

FIGS. 9A-11C depict a second exemplary embodiment of a bicycle pedal 2, which is similar to the bicycle pedal 1 of the first exemplary embodiment except that the second clamping member 30 is movably coupled to the pedal body 10 between a second clamping position and a second open position. Where the structure of the pedal 2 of the second exemplary embodiment is similar to the pedal 1 of the first exemplary embodiment, the same reference numerals are used and a description of the similar structure is condensed or omitted.

Figure 9A:
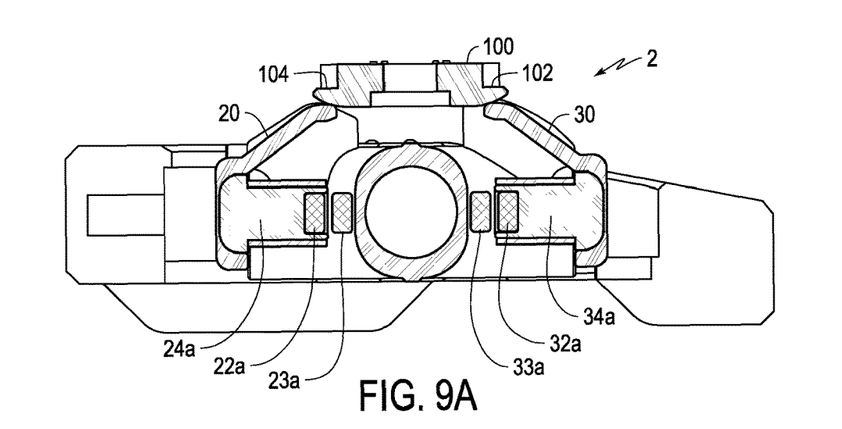
Figure 9B:
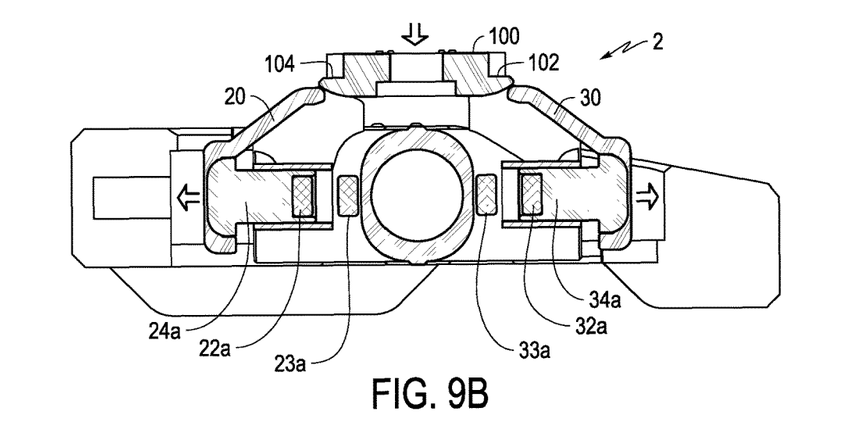
Figure 9C:
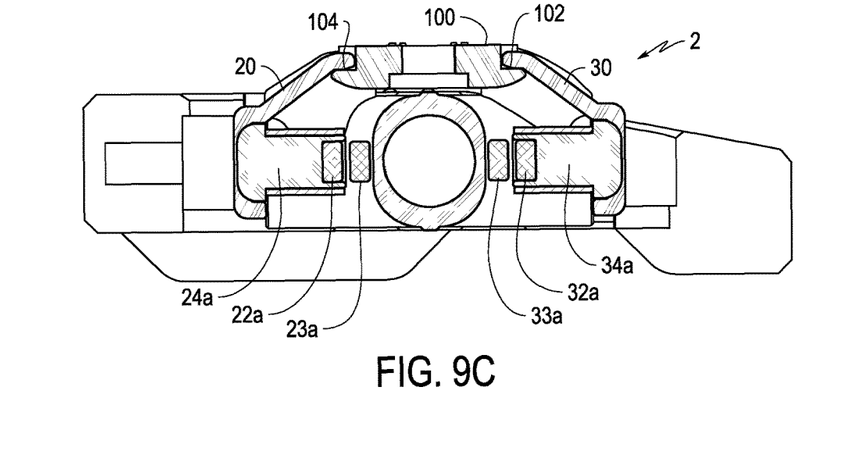
Figure 10C:
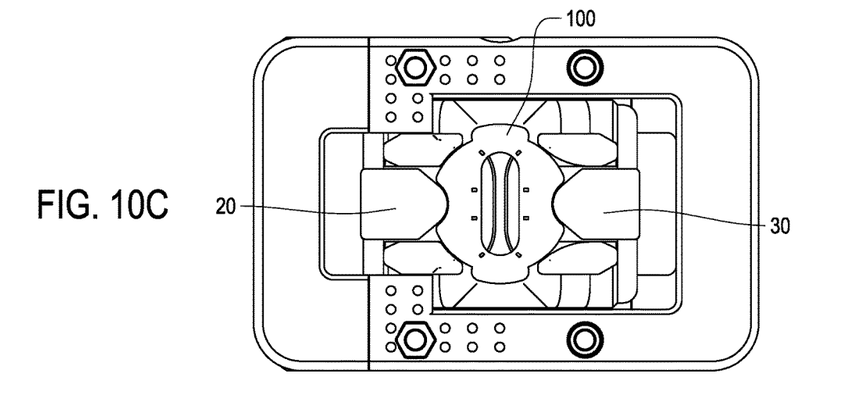

FIGS. 9A-10C show one process of clamping the cleat 100 onto the pedal body 10 of bicycle pedal 2. FIGS. 9A and 10A show a closed position of the bicycle pedal 2 before the cleat 100 begins entry. FIGS. 9B and 10B show a state in which a downward force is applied to the cleat 100 so that the front lip 102 of the cleat 100 forces the second clamping member 10 in a direction away from the rotational axis A into a second open position, and at the same time, the rear lip 104 of the cleat 100 forces the first clamping member 20 in a direction away from the rotational axis A into a first open position. FIGS. 9C and 10C show a state in which the cleat 100 has passed below the first clamping member 20 and the second clamping member 30 when they were in the respective first open state and second open state, and the first clamping member 20 and the second clamping member 30 have returned to their original state, thereby clamping the cleat 100 onto the body 10 of the pedal 2 between the first clamping member 20 and the second clamping member 30. In FIGS. 9C and 10C, the second clamping element 30 is in a second clamping position.

As shown in FIGS. 9A-10C, the first clamping member 20 and the second clamping member 30 are symmetrically disposed with respect to the pedal axle 5. The bicycle pedal 2 includes a second magnet 32a disposed in a second projection 34a on the second clamping member 30 to bias the second clamping member 30 toward the second clamping position. The second projection 34a can be slidably supported by a second sliding bush 36a. The pedal 2 also includes a second biasing element 33a that is disposed on the pedal body 10. Alternatively, the second magnet 32a can be disposed on the pedal body 10 and the second biasing element 33a can be disposed on the second clamping member 30. Like the first biasing element 23a, the second biasing element 33a can be made of a magnetic material such as, for example, iron, nickel, cobalt, gadolinium, or dysprosium, or an alloy containing one or more of these materials. Alternatively, the second biasing element 33a can itself be a magnet.

The second exemplary embodiment of the bicycle pedal 2 allows a rider to select an engagement direction. For example, the rider can insert the cleat 100 as shown in FIGS. 9A-10C to cause both the first clamping member 20 and the second clamping member 30 to move. Alternatively, the rider can insert the cleat 100 from a direction that causes only the first clamping member 20 to move as described above with respect to FIGS. 3A-4D. Still further, the rider can insert the cleat 100 from a direction that causes only the second clamping member 30 to move by utilizing a process similar to that shown in FIGS. 3A-4D, except that the rear lip 104 of the cleat 100 is inserted under the first clamping member 20 and pressing down causes the front lip 102 of the cleat 100 to force the second clamping member 30 in a direction away from the rotational axis A into the second open position.

Figure 11A:
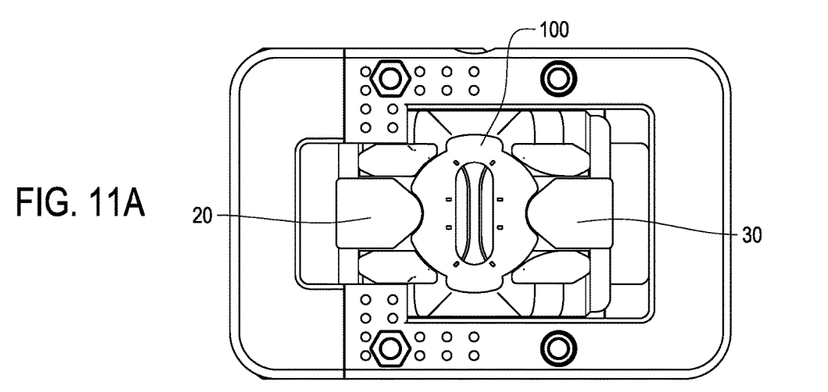
FIGS. 11A-11C depict a process of disengaging the cleat from the second exemplary embodiment of the bicycle pedal.
Figure 11B:
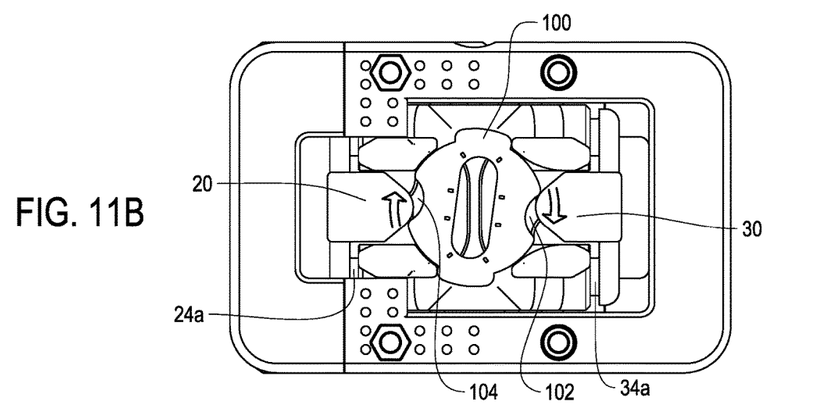
Figure 11C:
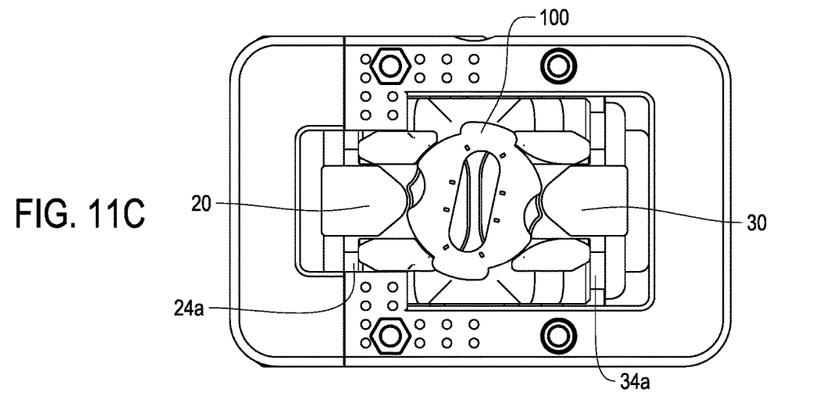

FIGS. 11A-11C, show one process of disengaging the cleat 100 from the pedal 2. FIG. 11A shows a state in which the first clamping member 20 and the second clamping member 30 clamp the cleat 100 onto the body 10 of the pedal 2 between the first clamping member 20 and the second clamping member 30. FIG. 11B shows a state in which a rider has rotated the cleat 100 clockwise so that the frontward-facing surface of front lip 102 (e.g., having a radius of curvature R3) contacts the rearward-facing surface of second clamping member 30 (e.g., having a radius of curvature R2) forcing the second clamping member 30 away from the rotational axis A, and the rearward-facing surface of the rear lip 104 (e.g., having a radius of curvature R3) contacts the frontward-facing surface of first clamping member 20 (e.g., having a radius of curvature R2) forcing the second clamping member 30 away from the rotational axis A. As shown in FIG. 11C, the rotation of the cleat 100 and the forcing away of the first clamping member 20 and the second clamping member 30 continues until the front lip 102 is clear of the second clamping member 30 and the rear lip 104 is clear of the first clamping member 20. At this point, the cleat 100 can be lifted away from the pedal body 10 without contacting either of the first clamping member 20 and the second clamping member 30.

This disengagement process works in a similar manner when either of the first clamping member 20 or the second clamping member 30 is fixed in place. For example, when the second clamping member 30 is fixed (stationary to the pedal body 10), as in the first exemplary embodiment, the cleat 100 is turned and the first clamping member 20 is forced away from the rotational axis A by a distance that allows both the front lip 102 to become clear of the second clamping member 30 and the rear lip 104 to become clear of the first clamping member 20.

As evident from the above description, the first clamping member 20 and the second clamping member 30 of the bicycle pedal 2 are configured to permit entry and release of the cleat 100 in a state in which at least one of: (i) the first clamping member is in the first open position, and (ii) the second clamping member is in the second open position. The structures described above for restricting the movement of the first clamping member 20 described above with respect to the first embodiment are applicable to either or both of the first clamping member 20 and the second clamping member 30 in the second embodiment.

Figures 12, 13:
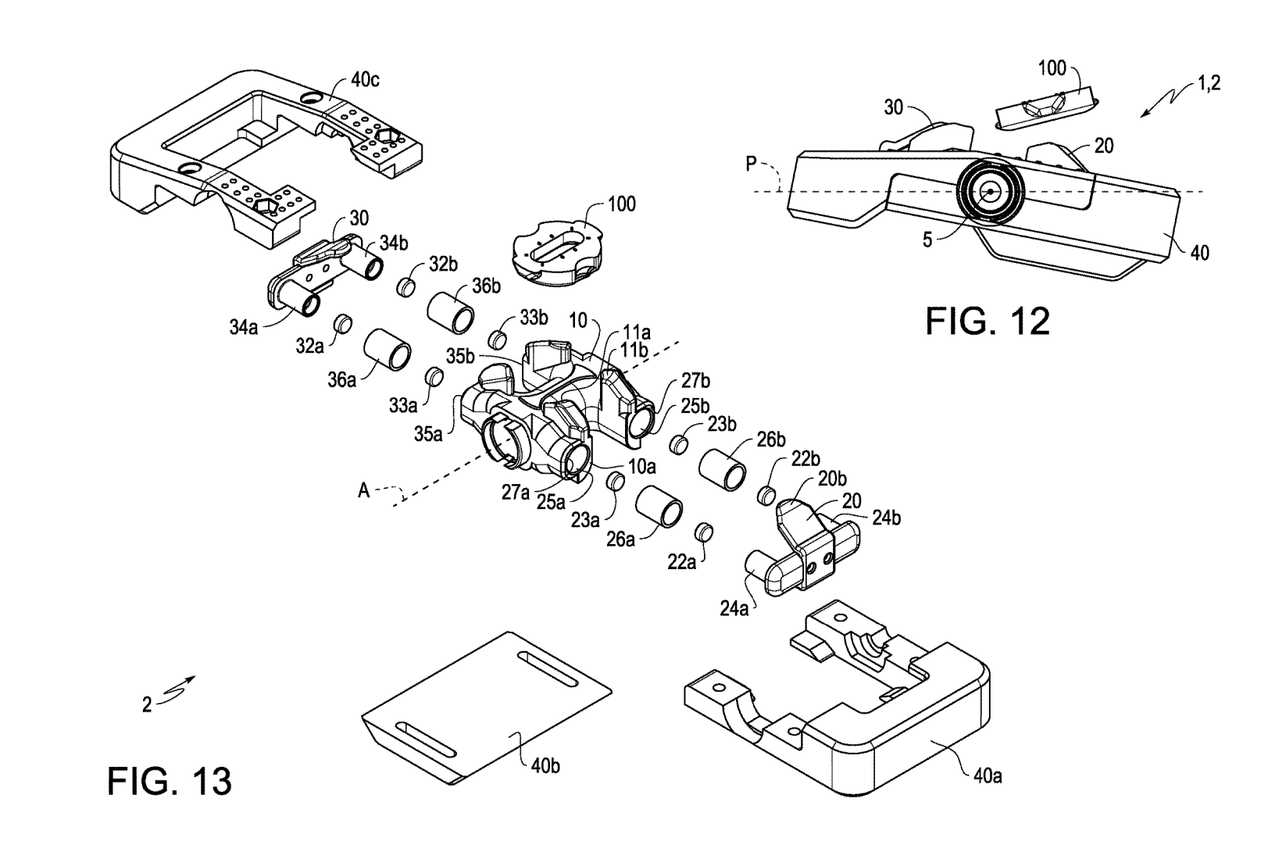
FIG. 12 depicts a resting state of the first or second exemplary embodiments of the bicycle pedal with the optional cage.
FIG. 13 depicts an exploded view of the second exemplary embodiment of the bicycle pedal.

FIG. 12 depicts a resting state of either bicycle pedal 1, 2, described above, when the mass of the cage 40 is asymmetrically distributed relative to the pedal axle 5. In particular, as shown in FIG. 12, the part of the cage 40 rearward of the pedal axle 5 has more mass than the part of the cage 40 frontward of the pedal axle 5. This mass distribution causes the cage 40 to be heavier on a side of the pedal axle 5 having the first clamping member 20 than on a side of the pedal axle 5 having the second clamping member 30 so that the first clamping member 20 rests lower than the second clamping member 30 relative to a plane P that is parallel to the ground in a state in which the pedal axle 5 is mounted on a bicycle that is positioned upright on the ground.

FIG. 13 shows an exploded view of the pedal 2 of the second exemplary embodiment to further illustrate the positional relationships of the structures described above with respect to both the first and second exemplary embodiments. As shown in FIG. 13, the pedal 2 can optionally include a third receiving space 25b with a third opening 27b spaced apart from the first receiving space 25a. The first clamping member 20 can include a third projection 24b slidably disposed in the third receiving space 25b. Furthermore, the pedal 2 can optionally include a third magnet 22b, a third biasing element 23b, and a third sliding bush 26b. As shown, the cage 40 can be formed of three parts 40a, 40b, 40c.

This structure can also be applied to the pedal 1, as a second receiving space 25b, a second opening 25b, and a second projection 24b, and optionally, a second magnet 22b and a second biasing element 23b. In this case, as shown in FIG. 13, the external opening 27a has a central axis B, and the first clamping portion 20b of the first clamping member 20 is disposed between the first projection 24a and the second projection 24b as viewed from a direction parallel to the central axis B.

As shown in FIG. 13, the pedal 2 can also optionally include a fourth receiving space 35b with a fourth opening 37b spaced apart from the second receiving space 35a. The second clamping member 20 can include a fourth projection 34b slidably disposed in the fourth receiving space 35b. Furthermore, the pedal 2 can optionally include a fourth magnet 32b, a fourth biasing element 33b, and a fourth sliding bush 36b.

Figure 14:
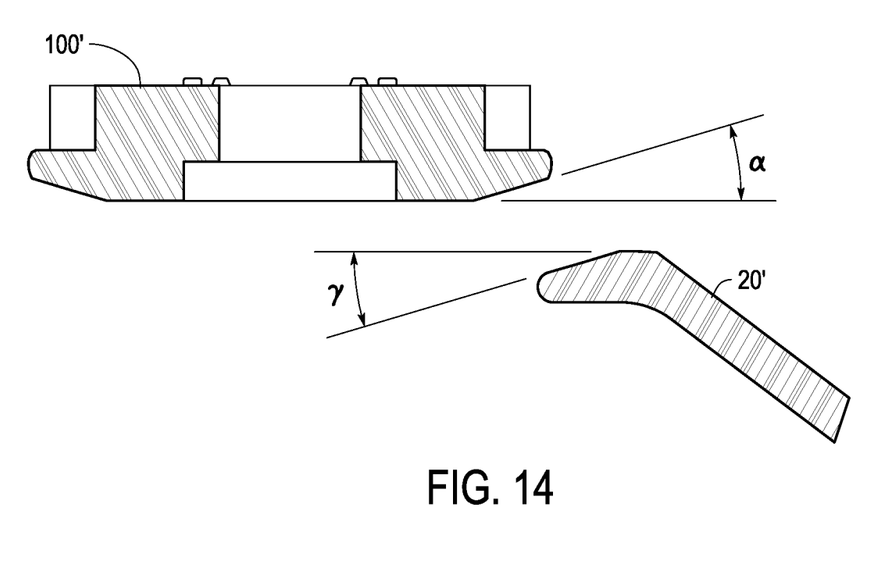
FIG. 14 is a partial cross-sectional view showing alternative surface configurations of the cleat and the first clamping member.

FIG. 14 shows alternative configurations of a cleat 100' and first clamping member 20'. According to these alternative configurations, the surface of the cleat 100' facing the first clamping member 20' can be a planar surface that is inclined from horizontal at an angle α and the surface of the first clamping member 20' facing the cleat 100' can be a planar surface that is inclined from horizontal at an angle γ. The angles α, γ can each be in a range of 13°-17° and preferably are set at 16.5°. Using the planar surfaces inclined at the angles α, γ, allows the cleat 100' to effectively apply a horizontal force on the first clamping member 20'. According to this alternative configuration, when a second clamping member is also movable, the same configuration can be used to effectively apply a horizontal force on the second clamping member.

In the above description and appended claims, the term "comprising" and its derivatives, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include," and their derivatives. Any terms of degree such as "general" or "generally" are intended to impart a reasonable amount of deviation to the extent that an end result or intended effect is not significantly changed. Further, as used herein, directional terms, such as "front," "back," "up," "down," "top," "bottom," "over," "under," and their derivatives refer to directions as viewed from a state in which a rider of a bicycle is sitting on a saddle of the bicycle in a riding position and facing towards the handlebar.

While exemplary embodiments have been described to explain the inventive principles, it will be apparent to a skilled artisan that various changes and modifications can be made herein without departing from the broad inventive principles. For example, the size, shape, location or orientation of the various components can be changed as needed and/or desired. Components that are shown directly connected or contacting each other can have intermediate structures disposed between them. The functions of one element can be performed by two, and vice versa. It is not necessary for all of the advantages described herein to be achieved by a particular embodiment at the same time. Thus, the foregoing descriptions of the exemplary embodiments need not limit the appended claims unless expressly recited therein.

What is claimed is:

1. A bicycle pedal comprising:
a pedal axle defining a rotational axis;
a pedal body rotatably supported on the pedal axle;
a first clamping member movably coupled to the pedal body between a first clamping position and a first open position;
a second clamping member provided on the pedal body, the second clamping member being configured to clamp a cleat between the first clamping member and the second clamping member in a clamping state where the first clamping member is in the first clamping position; and
a biasing structure including at least one magnet, the at least one magnet biasing the first clamping member toward the first clamping position.

2. The bicycle pedal of claim 1, wherein:
the at least one magnet includes a first magnet to bias the first clamping member toward the first clamping position;
the biasing structure further includes a first biasing element made of a magnetic material that biases the first magnet toward the first biasing element;
the first magnet is disposed on one of the first clamping member and the pedal body; and
the first biasing element is disposed on the other of the first clamping member and the pedal body.

3. The bicycle pedal of claim 2, wherein:
the second clamping member is movably coupled to the pedal body between a second clamping position and a second open position;
the at least one magnet includes a second magnet disposed on one of the second clamping member and the pedal body to bias the second clamping member toward the second clamping position; and
the biasing structure further includes a second biasing element that:
is disposed on the other of the second clamping member and the pedal body;
is made of a magnetic material; and
biases the second magnet toward the second biasing element.

4. The bicycle pedal of claim 3, wherein the first clamping member and the second clamping member are symmetrically disposed with respect to the pedal axle.

5. The bicycle pedal of claim 3, wherein the first clamping member and the second clamping member are configured to permit entry and release of the cleat in a state in which at least one of:
the first clamping member is in the first open position; and
the second clamping member is in the second open position.

6. The bicycle pedal of claim 2, wherein the first biasing element is a first additional magnet.

7. The bicycle pedal of claim 2, wherein the first magnet faces the first biasing element such that a gap is formed between the first magnet and the first biasing element in the first clamping position.

8. The bicycle pedal of claim 7, wherein the gap is larger than 0 mm and less than or equal to 5 mm.

9. The bicycle pedal of claim 2, wherein the first clamping member is slidably coupled to the pedal body.

10. The bicycle pedal of claim 9, wherein:
one of the pedal body and the first clamping member includes a first receiving space and the other of the pedal body; and
the first clamping member includes a first projection slidably disposed in the first receiving space.

11. The bicycle pedal of claim 10, wherein the bicycle pedal further comprises a sliding bush disposed in the first receiving space to slidably support the first projection in the first receiving space.

12. The bicycle pedal of claim 11, wherein the sliding bush is at least partly disposed between an outer peripheral surface of the first projection and an inner peripheral surface of the first receiving space.

13. The bicycle pedal of claim 10, wherein:
the first magnet is coupled to an end of one of the first projection and the first receiving space; and
the first biasing element is coupled to an end of the other of the first projection and the first receiving space.

14. The bicycle pedal of claim 10, wherein:
the first receiving space has an external opening disposed on an outer surface of the pedal body; and
the first clamping member includes the first projection inserted into the external opening.

15. The bicycle pedal of claim 14, wherein:
the pedal body includes a second receiving space spaced apart from the first receiving space; and
the first clamping member includes a second projection slidably disposed in the second receiving space.

16. The bicycle pedal of claim 15, wherein:
the external opening has a central axis; and
the first clamping member includes a first clamping portion disposed between the first projection and the second projection as viewed from a direction parallel to the central axis.

17. The bicycle pedal of claim 9, wherein the first clamping member is movable in a sliding direction perpendicular to the rotational axis.

18. The bicycle pedal of claim 1, wherein:
the first clamping member includes a first clamping portion extending toward the pedal axle; and
the pedal body includes a pair of guiding walls between which the first clamping portion is disposed.

19. The bicycle pedal of claim 18, wherein the pair of guiding walls each have a guiding surface to guide the cleat between the pair of guiding walls.

20. The bicycle pedal of claim 1, further comprising:
a cage at least partially surrounding the pedal body, the cage being heavier on a side of the pedal axle having the first clamping member than on a side of the pedal axle having the second clamping member so that the first clamping member rests lower than the second clamping member relative to a ground plane in a state in which the pedal axle is mounted on a bicycle that is positioned upright on the ground plane.

* * * * *